United States Patent [19]
Adkins et al.

[11] Patent Number: 5,742,699
[45] Date of Patent: Apr. 21, 1998

[54] PASSIVE VELOCITY MEASURING DEVICE

[76] Inventors: William A. Adkins, 845 Snow Queen Dr., Chuluota, Fla. 32766; James H. Pierce, 19029 U.S. 19 N., B2-18, Clearwater, Fla. 34624

[21] Appl. No.: 522,170

[22] Filed: Aug. 31, 1995

[51] Int. Cl.⁶ ..................................................... G06K 9/00
[52] U.S. Cl. ..................... 382/107; 382/103; 382/104; 382/106; 340/936; 340/937; 348/137; 348/140; 348/141; 348/171; 348/172; 364/438
[58] Field of Search ................................... 382/103–105, 382/107; 340/936, 937; 348/137, 140, 149; 364/423.098, 438

[56] References Cited

U.S. PATENT DOCUMENTS

| | | | |
|---|---|---|---|
| 3,788,201 | 1/1974 | Abell | 73/489 |
| 4,214,265 | 7/1980 | Olesen | 348/149 |
| 4,257,703 | 3/1981 | Goodrich | 356/4.03 |
| 4,433,325 | 2/1984 | Tanaka et al. | 340/937 |
| 4,839,648 | 6/1989 | Beucher et al. | 340/933 |
| 4,847,772 | 7/1989 | Michalopoulos et al. | 701/117 |
| 4,969,735 | 11/1990 | Gilligan | 356/3.14 |
| 5,172,235 | 12/1992 | Wilm et al. | 348/343 |
| 5,515,042 | 5/1996 | Nelson | 340/937 |
| 5,586,063 | 12/1996 | Hardin et al. | 364/561 |
| 5,590,217 | 12/1996 | Toyama | 382/104 |

*Primary Examiner*—Yon Couso
*Assistant Examiner*—Marc Bobys

[57] ABSTRACT

The presented invention provides the velocity of a moving target from a remote location. A CCD camera receives the image of the target vehicle and records this information on CCD array. The camera then outputs this information in a standard video format such as RS-170, NTSC, or equivalent to the frame grabber circuit card assembly located in the main computer. Custom software along with commercial frame grabber imaging software operates the computer in a Windows or DOS environment. The system will correlate the image of multiple frames stored in the frame grabber circuit card, along with the overlain reference lines and determine the velocity of the target vehicle in miles or kilometers per hour. The image data will be stored in the computer on removable media, along with all pertinent data of the incident including the time/date/location stamp, along with calibration factors and an image of the vehicle operator.

2 Claims, 10 Drawing Sheets

SYSTEM CONFIGURATION WITH MAIN COMPONENTS

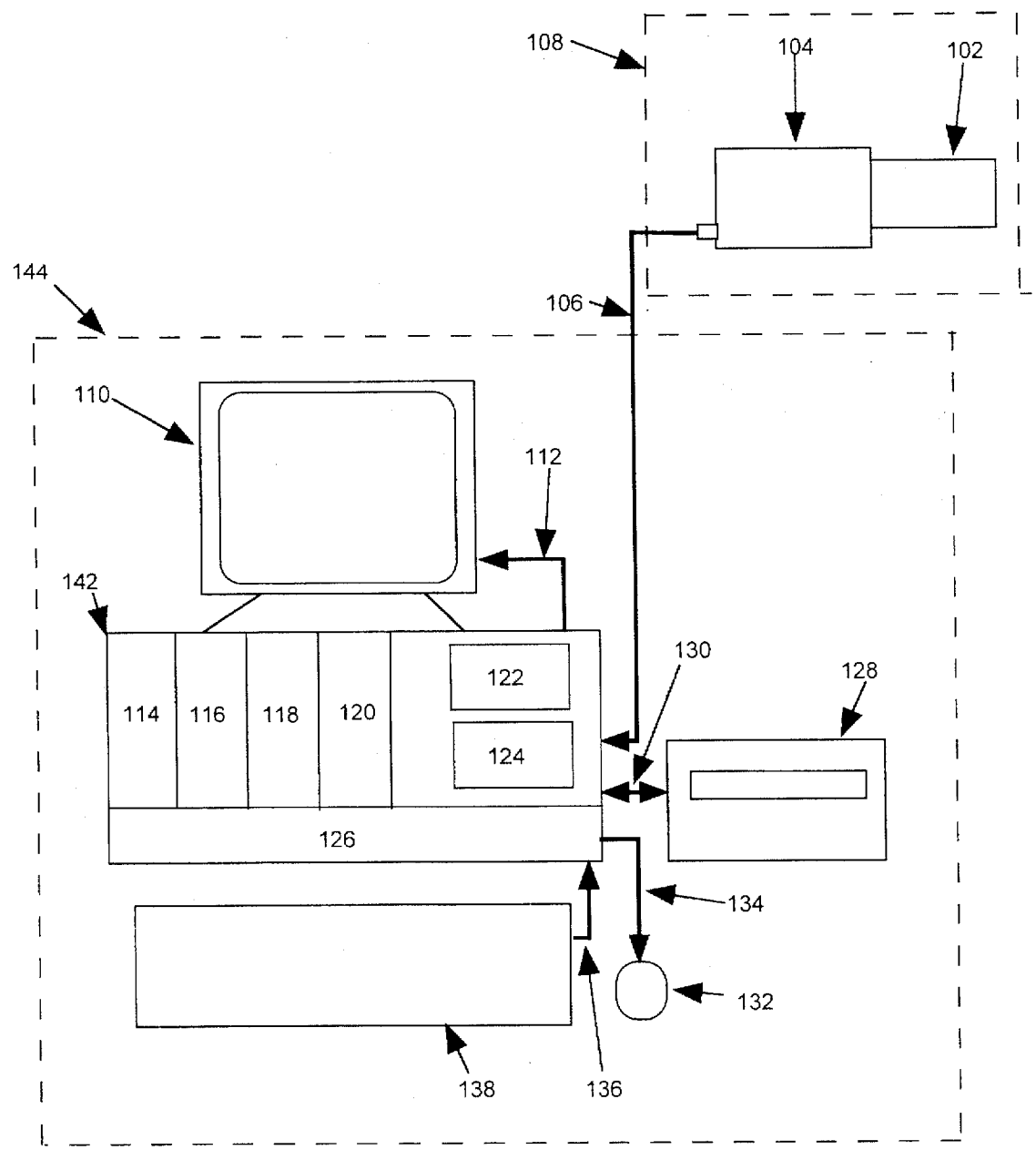
Figure 1: Passive Velocity Measuring Device System Interconnect

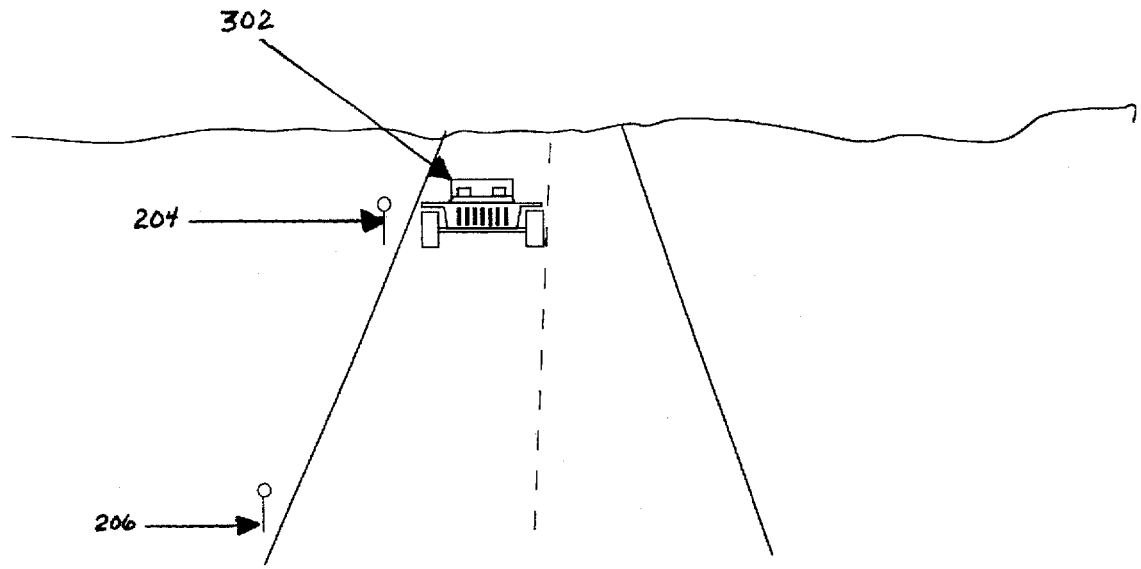
FIGURE 2A: REAL IMAGE OF LINEAR FIELD TARGET
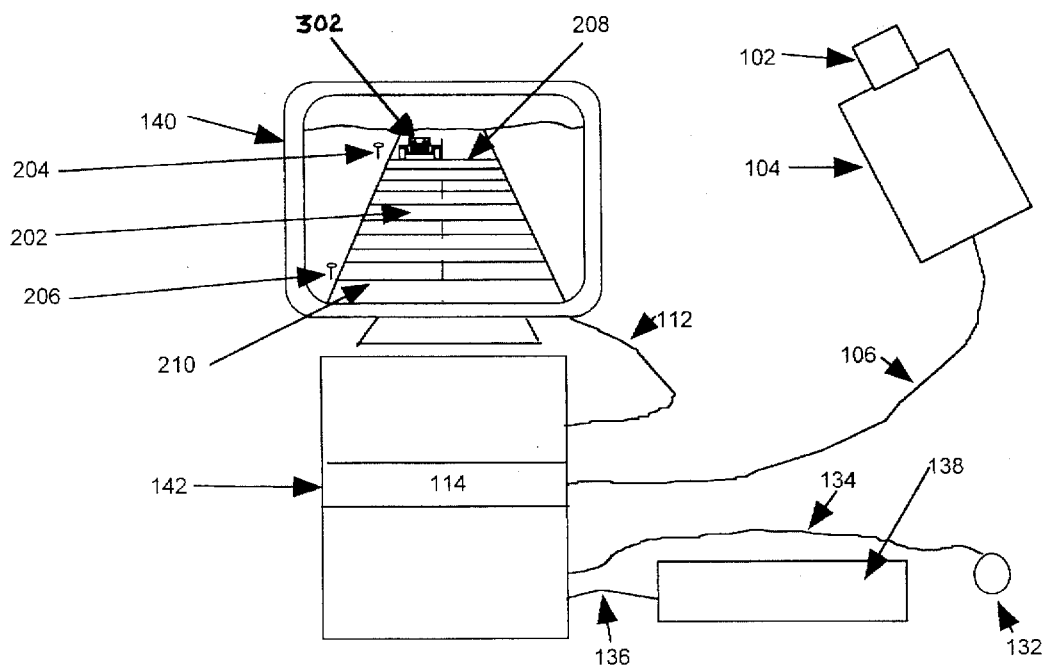
FIGURE 2B: SYSTEM CONFIGURATION WITH MAIN COMPONENTS

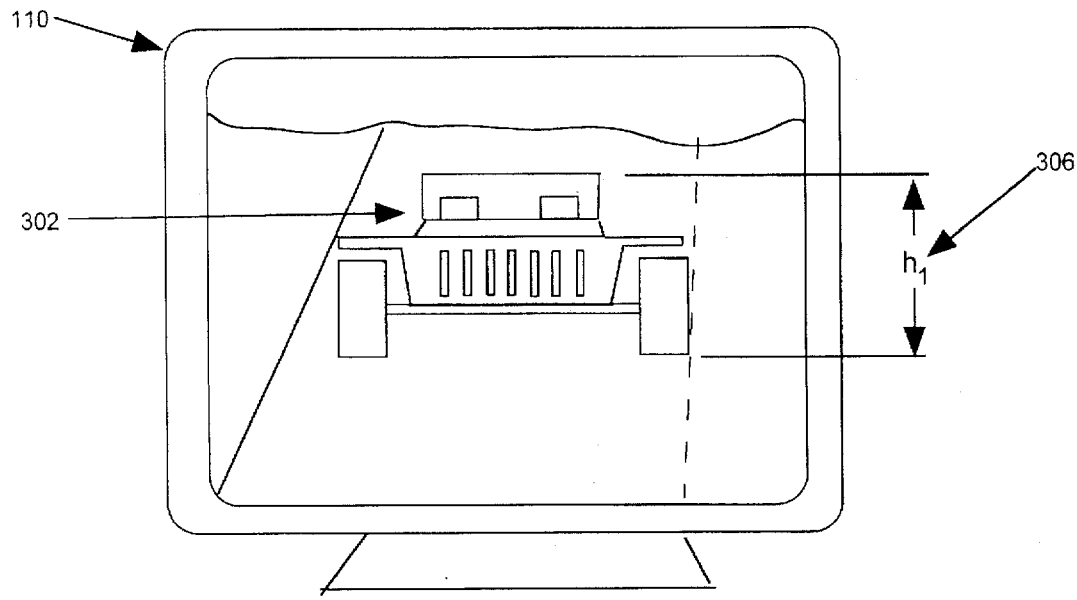
Figure 3A - Passive Velocity Measuring Device
Mode 1 Operation (1st Data)
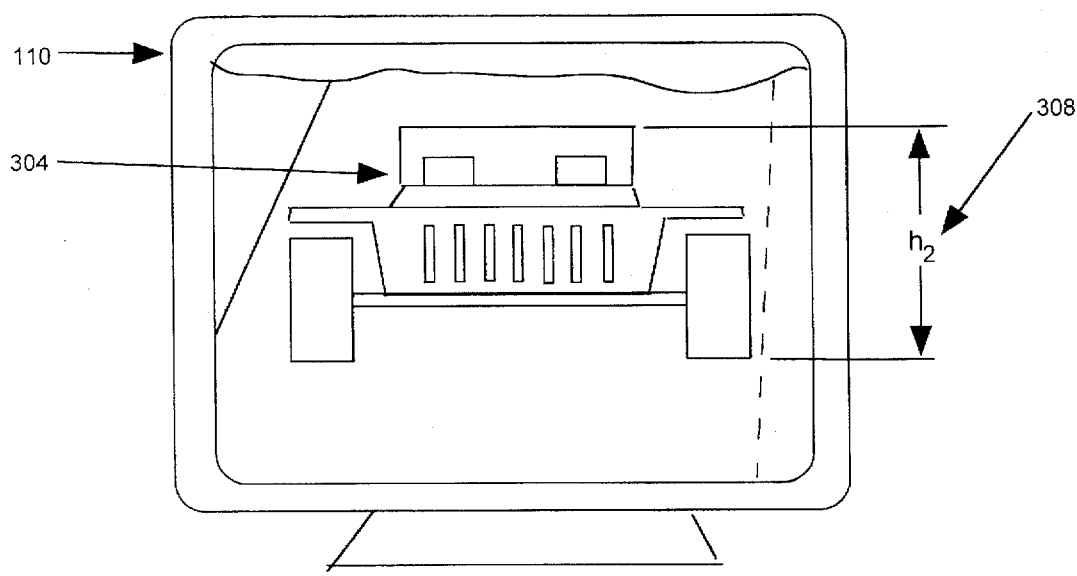
Figure 3B - Passive Velocity Measuring Device
Mode 1 Operation (2nd Data)

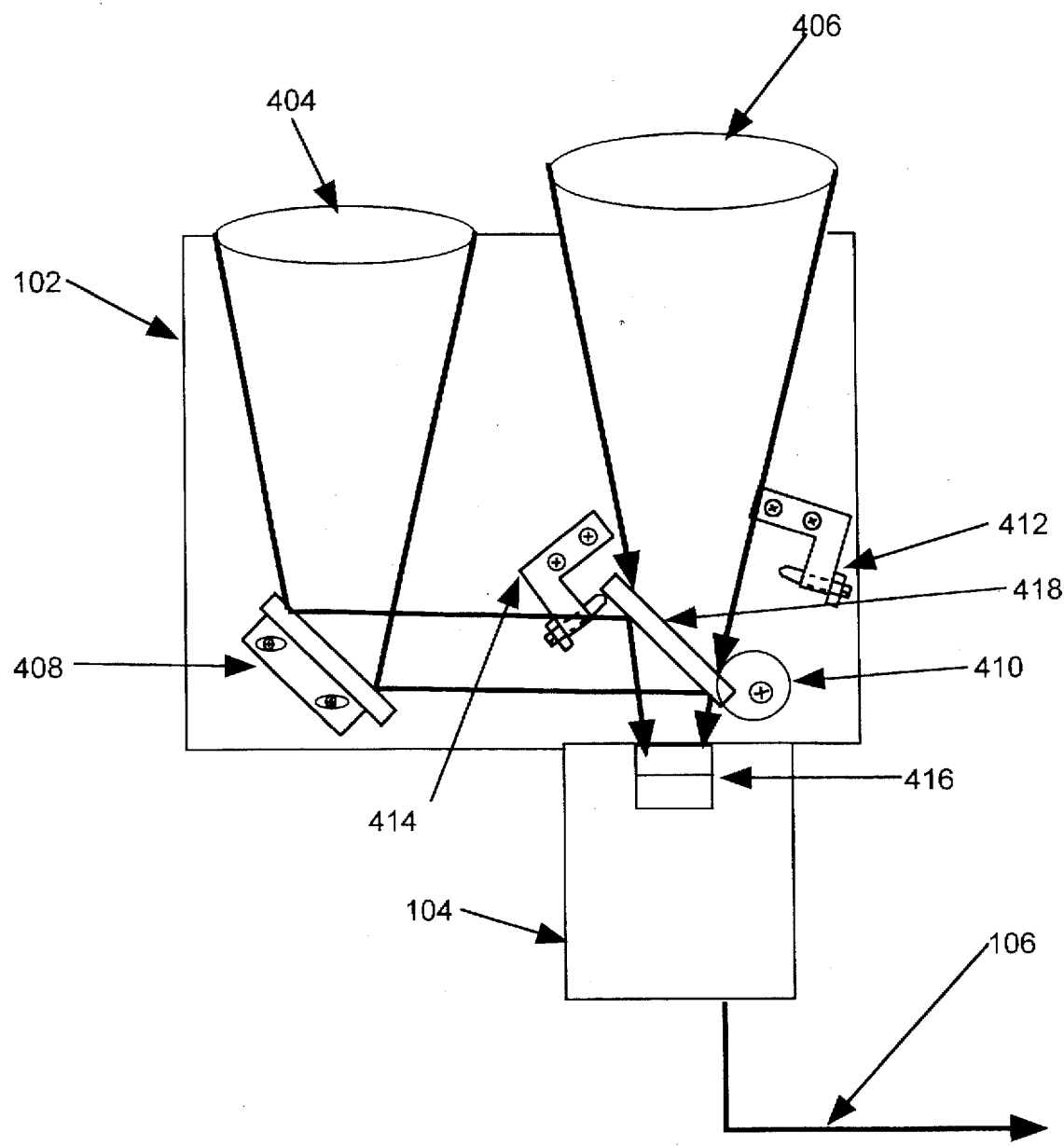
Figure 4: Passive Velocity Measuring Device
Camera and Optical Assembly

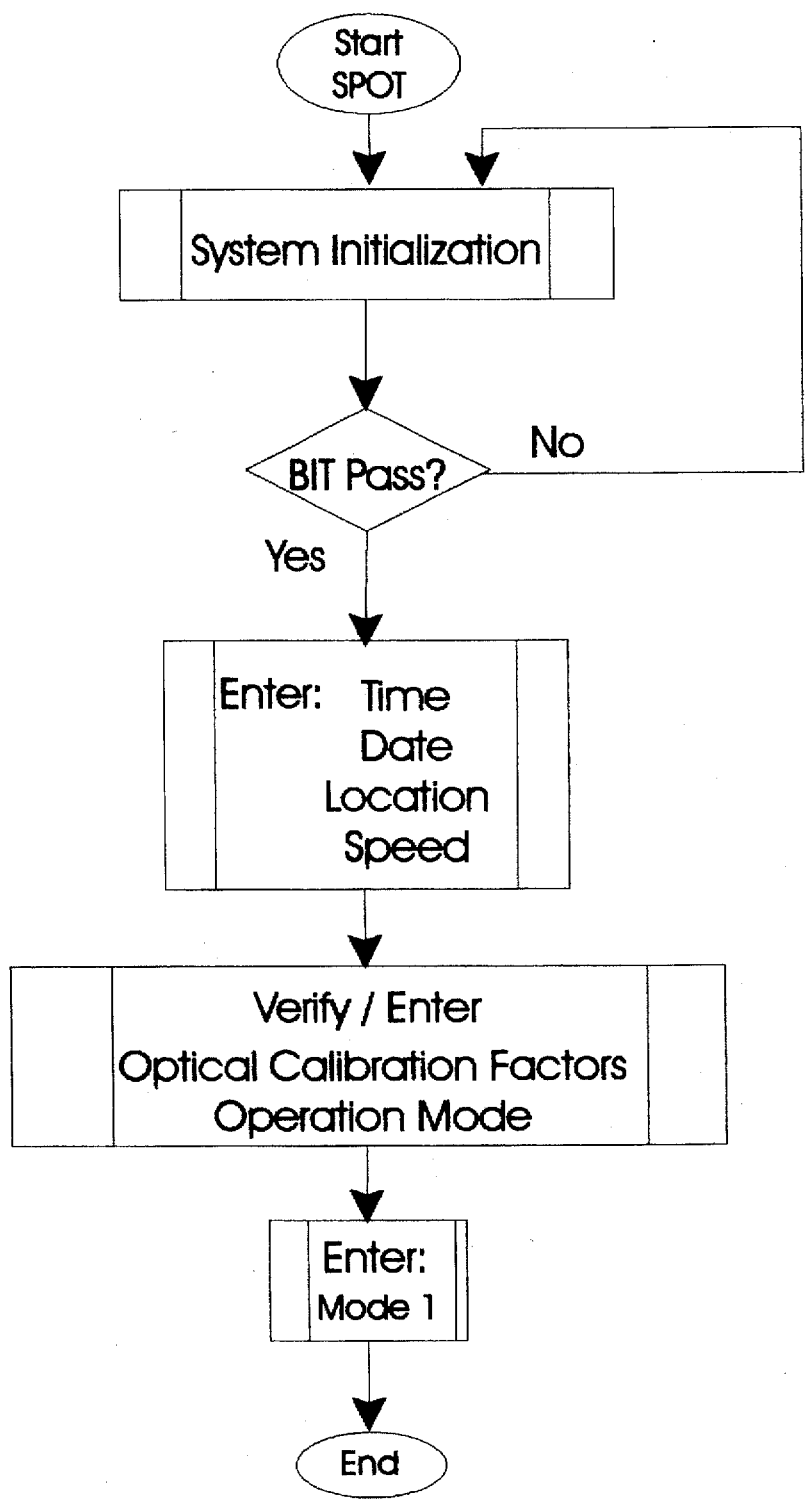
Figure 5A: System Initialization

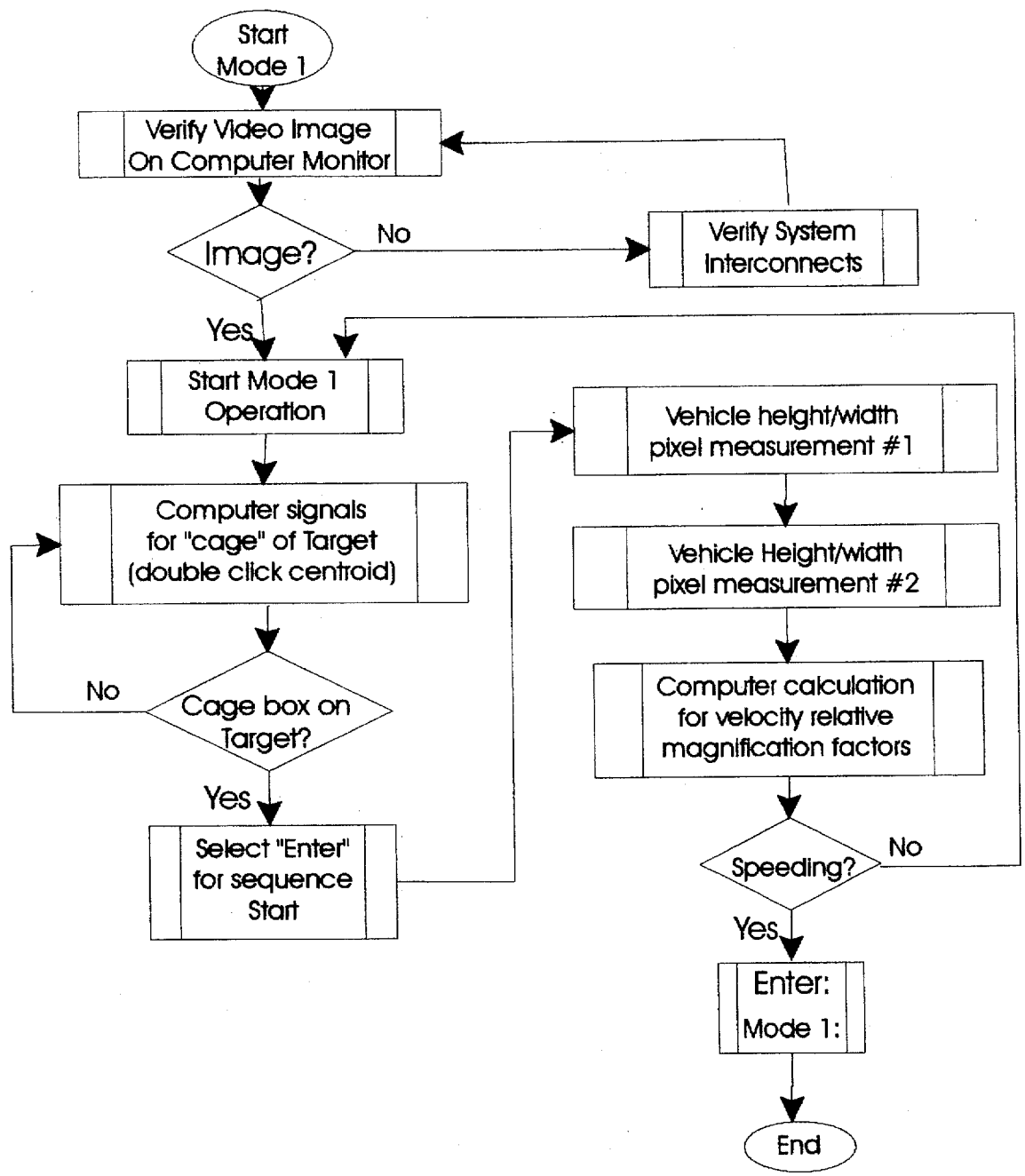
Figure 5B: Mode 1 Operation

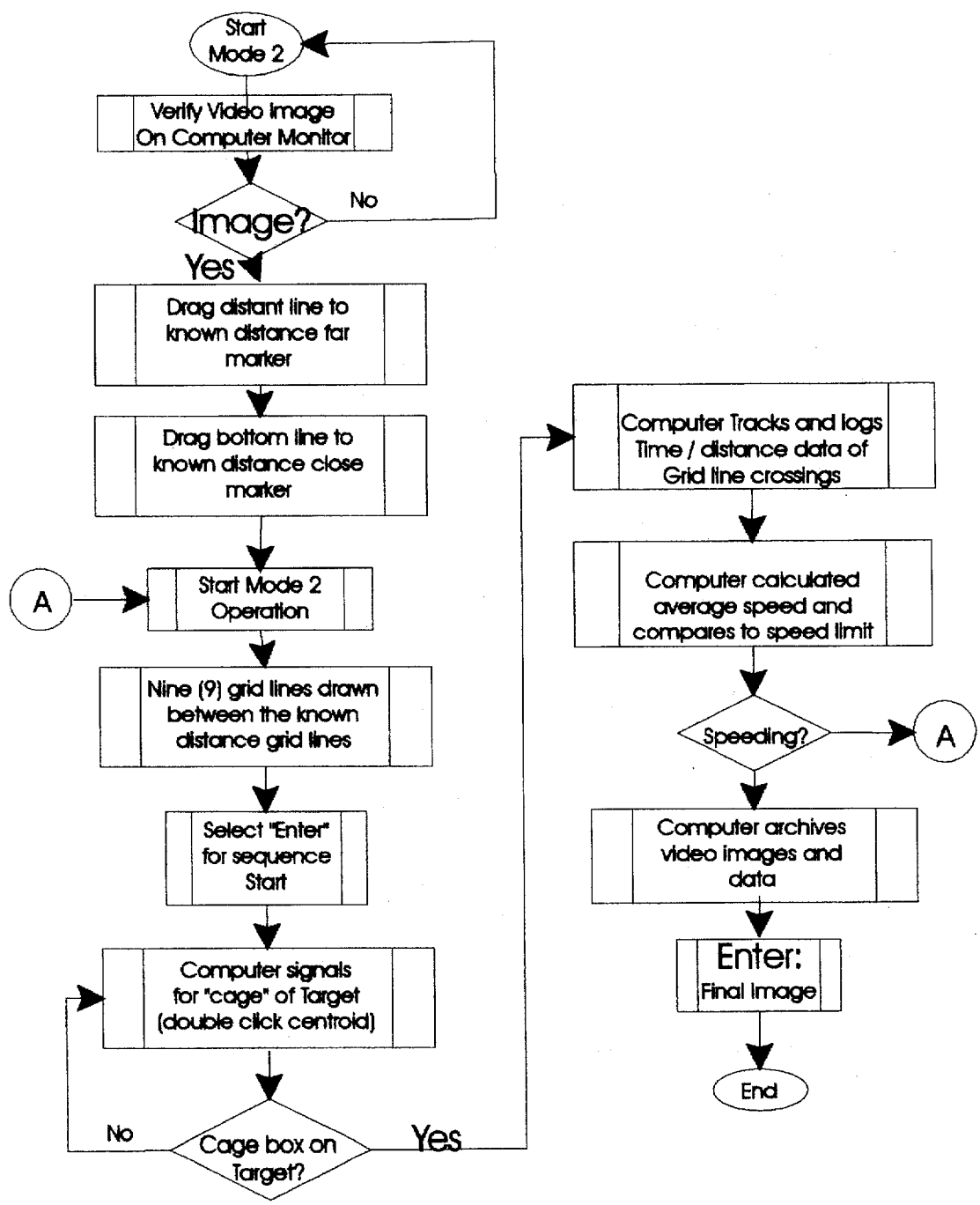
Figure 5C: Mode 2 Known Distance Velocity Calculation

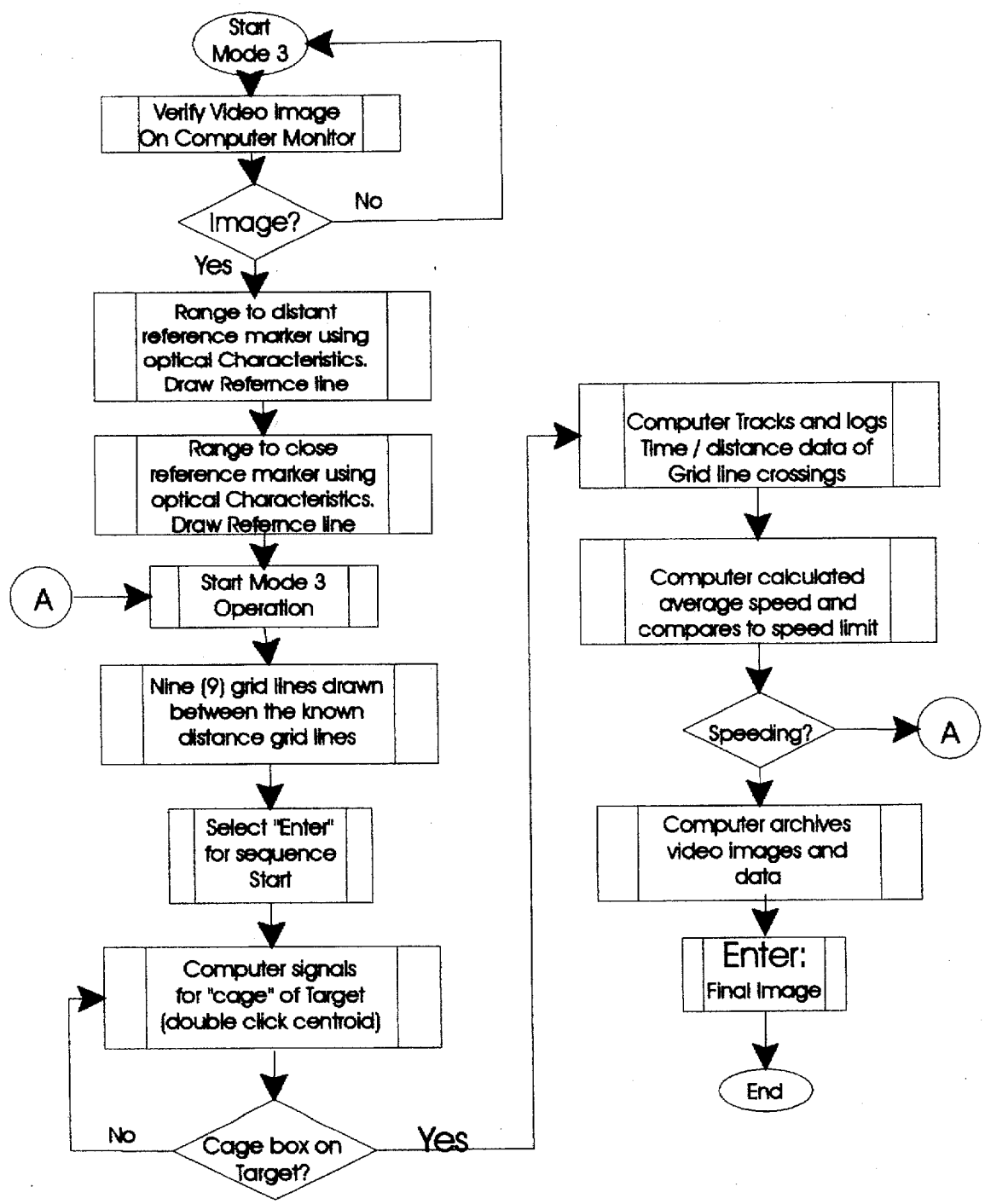
Figure 5D: Mode 3 Unknown Distance Velocity Calculation

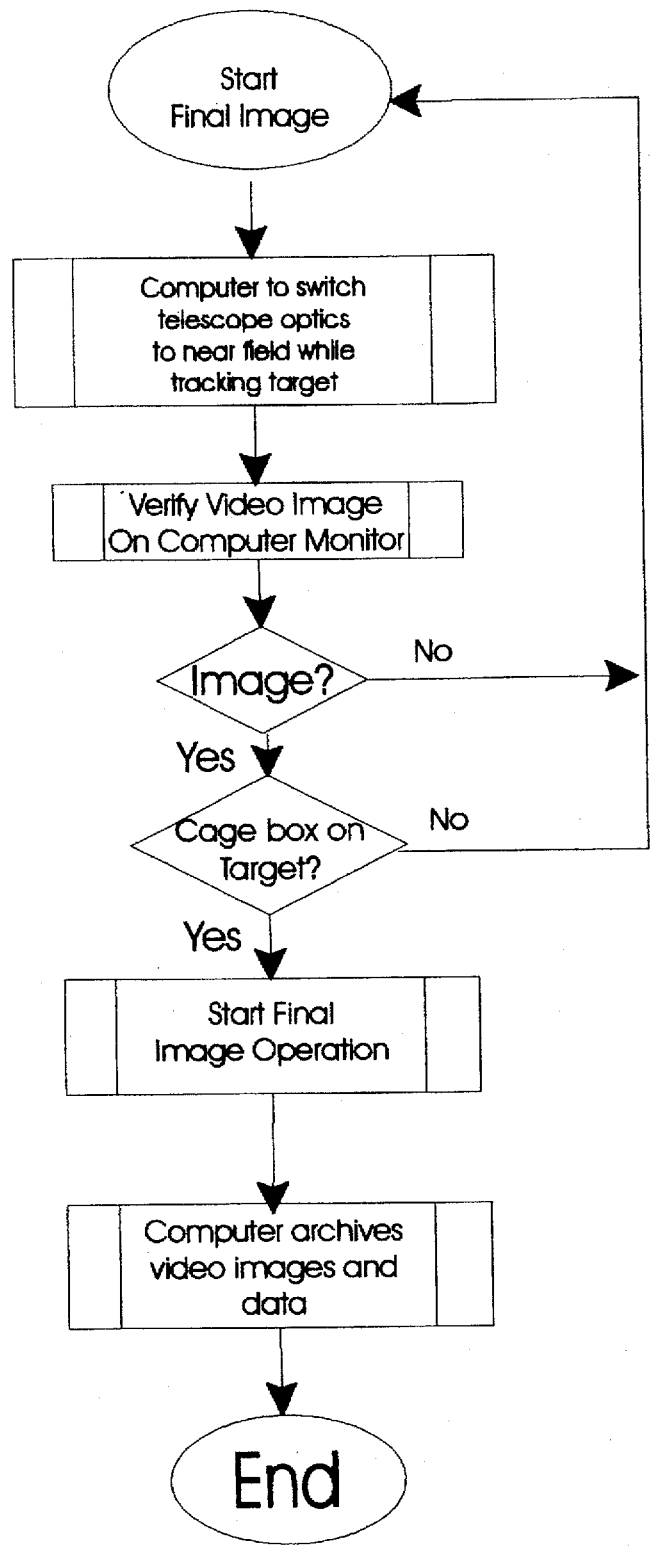
Figure 5E: Final Image and Data Archive

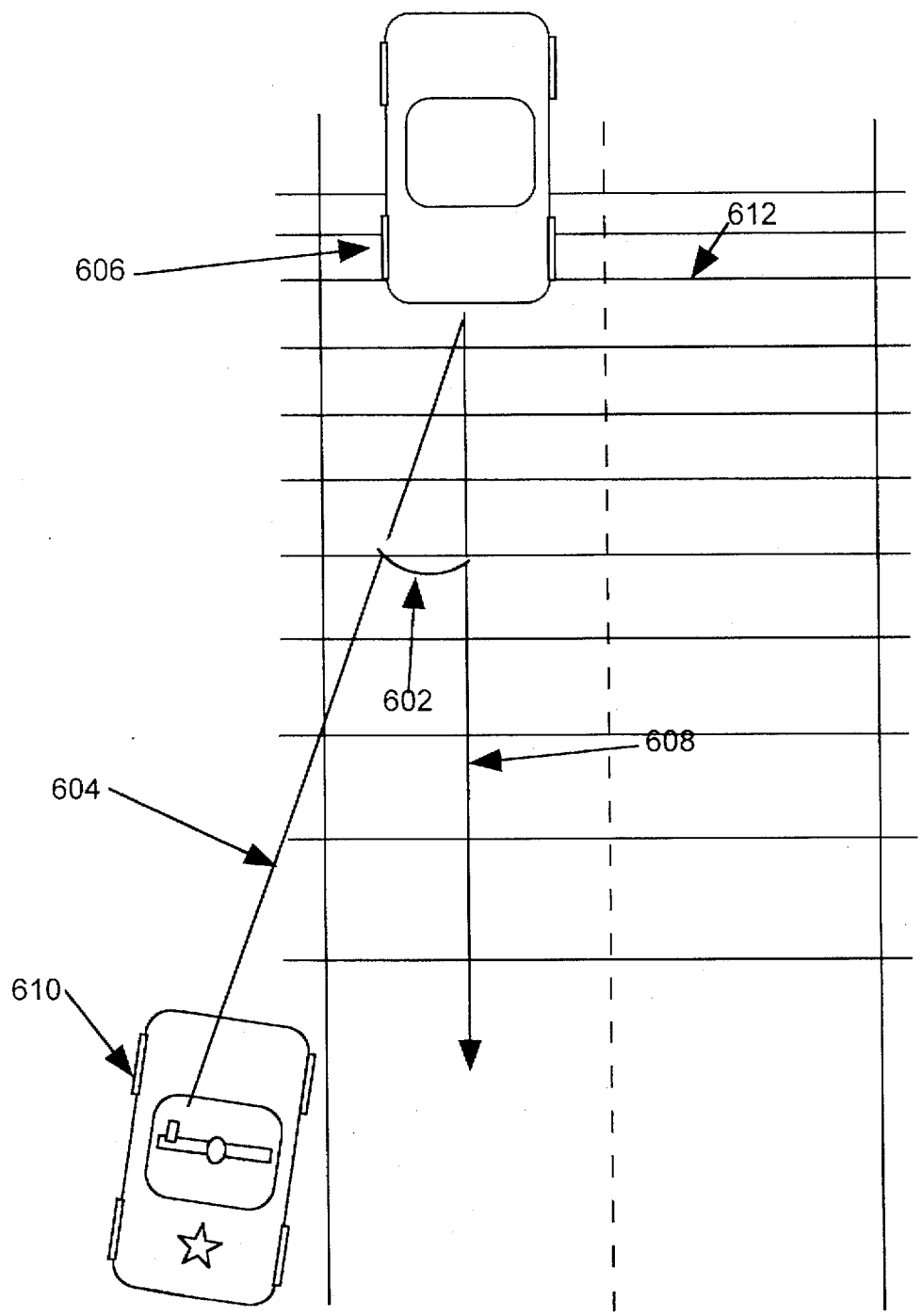
FIGURE 6: PASSIVE VELOCITY MEASURING DEVICE
TARGET VS. DETECTION ALIGNMENT
(View from above)

PASSIVE VELOCITY MEASURING DEVICE

BACKGROUND

1. Field of the Invention

This invention relates to the ability of an instrument or system to determine the velocity (speed) of a moving object from a remote location, and more particularly, a passive video imaging velocity detector.

2. Description of Prior Art

Many systems have been employed to determine velocity (speed) from remote locations, and typically evolved from military RADAR systems. With this technology, RF energy of a known frequency is emitted from a transmitter, bounced off the moving object or target, and received by the receiver adjacent to the transmitter. Upon receipt of the original RF energy, the frequencies are compared and the doppler shift is determined and the speed of the target is calculated.

Current variations of the above technology, as the speed of electronics has advanced, has provided the ability for the frequency of the RF energy to get higher (Ghz) which has provided, by the natures of higher frequencies, a more directional beam. This has led to systems used by law enforcement departments to point directly at vehicles to determine the speed or velocity, and thus possibly issuing moving violations with regard to speeding.

Even further advances in the circuit speed and technological advances have moved the frequency of operation into the "infrared light" frequencies where the time of flight of the LASER pulse is used to determine speed. Also millimeter wave RADAR is being used to determine the velocity with a doppler shift and produce a video signal from the target reflection, though inefficient relative to this invention's technology.

Though all these technologies determine the end result, the velocity of the target, they do have specific deficiencies. The main problem with these systems using RADAR and doppler shift technology is that they emit energy, either RF or LASER, which can be detected! Thus the invention of RADAR and LASER detectors which provide a warning signal allowing motorists time to slow to a legal speed.

Pertinent velocity measuring devices researched during patent infringement verification are listed below, and typically have emission of energy to operate, operate inductively, or by video sensing, and must have known parameter setup:

1) Classical RADAR (U.S. Pat. No. 4,316,173 issued 1982) uses RF emissions to calculate the velocity of a target through doppler shift calculations of phase shift.
2) Pulsed Doppler RADAR (U.S. Pat. No. 5,191,347 issued 1993) uses millimeter wave RF emission for velocity solution through doppler effect calculations.
3) Ferrous vehicle velocity (U.S. Pat. No. 625,115 issued 1994) uses road embedded inductors to detect vehicles passing two points of a known distance in a clocked time period, thus calculated velocity as distance/time.
4) Vehicle velocity in a tunnel (U.S. Pat. No. 5,353,021 issued 1994) uses imaging technologies with known distances marked for reference inside the tunnel.
5) Classical LASER RADAR (U.S. Pat. No. 5,359,404 issued 1994) uses LASER energy and the time of flight of the pulse to determine velocity.

Since time has passed and the use of the RADAR technology to detect the velocity of a target has proven efficient and profitable in the task of controlling speeding and moving violations by Police, other problems, besides detection, have become apparent. The use of microwave frequencies for RADAR has been cited as causing medical problems in regard to tumors and cancer for the law enforcement officers who operate the RADAR systems. LASER systems, even though in the infra-red region of light do not cause blinding light, but eye damage may result with direct or reflected LASER energy.

The "SPOT" speed detection system, does not have emissions to be detected or dangers in its operation. This system will not only calculate the speed of the vehicle, it will store an image with pertinent information of the incident recorded with the image file. The system will be accurate, upgradable in regard to new or more accurate algorithms and processing speeds, and may be implemented into the majority of presently fielded law enforcement computer systems. The system will be impossible to detect due to its passive nature, and jamming of the system will be impossible.

CROSS REFERENCE

Objects and Advantages

This invention is new and unique in regard to the technology used to detect a target's speed. It uses video imaging technologies and is of a passive nature, using the video image received with a camera, then via magnification factors or superimposing grids into the video image, the speed is calculated with a computer. Other distinguishable differences from systems currently used are that this system is:

1) Passive—this means that the system does not emit any electromagnetic energy during functional operation, thus making it safe for the user while being undetectable.
2) Storage Capability of Data—retains a permanent image of the infraction including time, date, location, and an image of the target (automobile) with significant vehicular information (tag number and operator image) included.
3) Computer can track a specific target, eliminating operator intervention in the process through a caging function (image centroid tracking), thus taking the human error factor out of the operation, and eliminating errors or arguments that the offending target (automobile) was misidentified.
4) Less Angle Dependence—the computational capabilities of the SPOT system computer allow greater flexibility in usable angle and greater accuracy at any angle.

BRIEF SUMMARY OF INVENTION

This invention is a non-emitting (passive) system used to measure speed that will employ imaging and video processing technologies using near real time computer processing to determine the speed of a target. Advantages of this technique include it's inherently undetectable nature and lack of physical threat to the operator. The image may be stored for validation of failure with time/date stamp and data relative to location, calibration, and speeding information superimposed on video and stored in the computer hard drive. The system is passive in nature thus making the mean time between failures much lower than an active system.

The system employs two subsystems, a camera for image reception with a data link for inter-communication to a computer system and the frame grabber circuit card assembly. Image and data information will be stored on hard drive(s) for continued processing at a later time. The following parts of the system will be defined and examined:

Subsystems
1) Video Camera with custom or commercial optics
2) Computer
    2.1) Frame grabber CCA
    2.2) Monitor and Video CCA Operating Modes
1) System Initialization
2) Mode 1—Magnification Go/Nogo Test
3) Mode 2—Target Acquisition and Speed Calculation (known distance)
4) Mode 3—Target Acquisition and Speed Calculation (unknown distance)
5) Final Image—Video Zoom for Image and Archive The following are detailed descriptions of all subsystems, modes of operation, and typical scenarios. The main subsystems of the passive velocity measuring device are listed below:

1) Video Camera—this unit will send video data signals to the frame grabber of the computer via wire. Typical characteristics of the camera will be a CCD camera outputting standard format.

Note
    Color camera option available to further discriminate target.
    IR Camera may be used for night surveillance.
    CCD will be high resolution sized.

2) Frame Grabber—this unit will be used to interface with the camera and receive video image data for computer processing and will be able to store and process multiple image frames.

3) Computer—this unit will receive the operator input commands in regard to calibration, field of view, and time/date stamping of image. The computer will interface to the camera via a frame grabber circuit which may be physically inside the computer. The computer will receive information from the camera via the frame grabber and process the image using the control of the software program for the system relative to the calibration matrix, system mode of operation, and determination of pass/fail regarding speed limit. On fail, the computer tags or cages the target using the commercial frame grabbers centroid analysis function in conjunction with the control software and do repeated measurements to obtain an average reading of the discrepency.

Operating Modes
Initialization

The system is initiated by powering up the computer and camera. Upon computer boot, the operator enters the custom software control program and initiates a built in test (BIT) routine that checks the frame grabber circuit card and the camera. Upon BIT passing, initialization data is input into the program regarding time and date, location, speed limit for the site of speed measurement. The system optics calibration factors (located on camera telescope) are verified or input, and the operating mode is selected. Upon selection of the mode of operation, the video will be received by the camera, and processed by the frame grabber and viewable on the computer monitor so camera pointing and video contrast and brightness may be set up.

Mode 1

This operating mode is not for exact speed calculation, but to determine if a target vehicle is speeding. In this mode, the telescope is in the far field of view so targets may be acquired for view at distances up to 1 mile. The target is "caged" using the frame grabber centroid tracking algorithm and an image is received. The system waits two seconds then takes a second picture. The difference in height or width relative to pixel values is calculated and per optical magnification calibration parameters, the distance is calculated and divided by the two second time, then converted to miles per hour for comparison to input speed limit.

Mode 2

This operating mode calculates the exact speed of the target and starts directly after mode 1 operation. Initially the computer generated "grid" is set up by computer cursor dragging the distant grid line to a marker, and dragging the closest grid line to an inner marker. Upon completion, the computer adds nine (9) more grid lines per a distance/magnification algorithm to parallel the two end lines at equal distance. Upon completion of this setup, the target is again caged and tracked as it crosses the computer generated grid with images and distance/time calculations of velocity for 10 samples. The average of the 10 samples is calculated and the overall velocity is determined and compared to the speed limit input.

Mode 3

This operation is a duplicate of mode 2 except the distance of the distant and inner grid markers are not known and optical magnification calibration factors of the telescope are employed to calculate the distance of the grids.

Final Image

This operation is a video zoom to "see" the operator of the target vehicle. The camera is switched to the zoom near field optics and the operator, vehicle and tag are recorded with mode 2 image and data. The initialization data is overlain on the mode 3 image so as not to obstruct the image view of the operator and vehicle tag.

System Calibration

Mode 1 and 3 operation of the "Passive Velocity Measuring Device" system will be calibrated to the CCD array pixel level in a laboratory environment per the optical magnification characteristics of the chosen camera for the system. This calibration will be performed to categorize the camera telescope optics using known size targets at known distances and mapping the CCD pixels. This data will be input into a software lookup table for system access and these calibration factors will be attached to the optical assembly. Dependent on the range switching or zoom characteristics of the chosen camera, multiple calibration factors will be available/embedded in the software. These factors will be accessible for manual input from the computer for field calibration of the system which can be performed in cycles to assure proper performance.

Mode 2 calibration methods would use range data from physically placed targets (ref FIG. 2A), or use LASER ranging techniques, using an eye safe LASER, to chosen targets in the field of view of the system at particular setup locations. This ranging would involve two targets being pulsed and ranged with data and pixel location input into computer for calibration process.

Different terrain characteristics may be compensated for with shortened tracking fields which would more approximate a flat surface, or by ranging techniques that would attain a more detailed map of terrain by multiple ranging targets.

System Advantages

Day or night capability through visible or infra-red camera
Automatic or manual operation for "caging" target of choice.

Remote camera locations (bridges, poles, etc.) with permanent wiring for "out of sight" usage. No calibration updates in this scenario.

Existing computers may be upgraded to the system configuration with a circuit card, camera, and software addition.

No electromagnetic or light energy emission, therefore safe for user.

Passive system, can not be detected.

Permanent image record of infraction with time/date, location, and data, and visual image of the driver.

System will measure speed as accurately as any RADAR or LASER system.

Calibration factors, location, time, date, and all pertinent information shall be displayed with image.

Due to passive nature of system and lower complexity, the MTBF (mean time between failure) may be significantly lower than current velocity measuring systems.

DRAWING DESCRIPTION

In the drawings, which illustrate what is presently regarded as the best mode(s) of executing the invention, like reference numbers indicate like elements, and:

FIG. 1 is the setup of system including all main hardware subassemblies required for system operation and data processing/storage.

FIG. 2A is a simulated image of a typical road and the ranging function involved with the image. Assume the target automobile is moving forward toward the camera location displayed in FIG. 2B.

FIG. 2B shows the mode 2 operation and the SPOT system components and how the image would be superimposed on the computer screen with lines such that speed information could be calculated relative to line distance and real/elapsed time.

FIGS. 3A and 3B is the mode 1 operation of the system determining the go/nogo for the criteria input to determine if target is speeding, via magnification vs. time calculations.

FIG. 4 is the diagram of the camera and optics of the system.

FIGS. 5A thru E are the Flowcharts of system modes of operation.

FIG. 6 is typical roadside scenario of setup for velocity detection, along with directional vectors and imaging angles with error induction.

DETAILED DESCRIPTION OF THE ILLUSTRATED EMBODIMENTS

FIG. 1 depicts the working embodiment of the passive velocity measuring device. This embodiment incorporates the two main components of the camera assembly 108 and the computer system 144.

The camera assembly 108 consists of the optical assembly 102 and the CCD camera 104, and the camera data cable 106. The camera assembly is used for imaging the information in the field of view of the camera, through the appropriate optical path, which is dependent upon the distance of target from camera assembly 108. The image of the target in question is received by the optical assembly as either a visible image or infrared energy image dependent upon camera being used, and is relayed by the optical assembly to the CCD camera detection device which generates an electrical signal relative to the optical picture. This information signal is transported using data cable 106 from the camera to the Computer system 144 for processing. (Reference FIG. 4 for detailed camera operation)

The computer system 144 receives the image data from the camera assembly directly by the frame grabber circuit card assembly 114. The frame grabber CCA 114 is set up to process the format of video of the specific camera connected. Other utilities of the frame grabber are video RAM to analyze and process multiple images at near real time speeds, along with mathematical processing involving centroid analysis for target detection, and video overlay for velocity processing. Dependent upon the frame grabber CCA 114, the video image may be sent directly to the video monitor 110, or be passed to the video CCA 116 for processing and transport to the video monitor 110. This function will allow the operator to see the image that the camera sees, which enables the usage of manual target selection.

Other assets of the computer system 144 are a floppy drive 122 for operator and system upgrade or download of information, and an on board hard drive 124 for the operating system of the computer system and the application program for the passive velocity measuring device operation. These two information drives 122 and 124 are controlled with the Controller card 120 as in any computer system.

Video imaging takes up a lot of space in memory and for storage therefore a CD Recorder 128 provides for massive storage of scenario and video information. This CD Recorder is connected to the CD Recorder Control CCA 118, by the CD Data cable 130.

The computer system has a standard personal computer keyboard 138 and cable 136, and a mouse or trackball 132 and cable 134, for connection to the I/O portion of the controller card 120. These two assets are for operator intervention, control, setup, and manual operation of the system.

FIG. 2A displays a vehicle 302 and roadway scene that will be used to explain the operational scenario of the passive velocity measuring device. Assume that the vehicle shown in FIG. 2A is moving toward the bottom of the sheet simulated by the depth portrayed in the drawing. The horizon line is for reference.

FIG. 2B depicts a typical system view and display of Mode 2 operation. The known distance of a stationary object at far distance 204 and stationary object at the near field 206 is obtained from a known computer database or from operations such as LASER ranging. This distance data will be input into the computer program at system setup.

The computer 142 will prompt the operator to drag the upper line 208 using mouse 132 to be adjacent to the stationary far field object 204, and drag the lower line 210 to be adjacent to the near field stationary object 206. The computer 142 will add additional grid lined 202.

The system will display camera information using camera optics 102, camera CCD 104, and the camera data cable 106 to the frame grabber 114. The computer software will control frame grabber 114 to start taking change in distance vs. time calculations as the target crossed the superimposed grid lines 202.

FIG. 3A shows the initial view of the vehicle 302 portrayed in FIG. 2A and mode 1 operation. The initial image is caged per a subroutine that tracks objects and centroids of the object. The computer then places correct pixel picture in the view and the system operation starts by taking the initial pixel height measurement h1 306. At an exact time delay later, the vehicle coming toward the camera will be enlarged and viewed as portrayed in FIG. 3B and the second height measurement h2 308 is taken. With calibration of optical characteristics and ranging equations calculated for the optics, the distance divided by time delay will give a speed which can be compared against legal speed for a quick pass/fail determination. Upon fail, mode 2 operation is entered.

FIG. 4 is the passive velocity measuring device's camera and optical assembly. The optical assembly 102 consists of two (2 ea.) optical paths. For the far field of view, the imaging light travels through far field lens 406 directly to the camera 104 frame transfer CCD 416. The image is processed by camera 104 and sent via camera data cable 106 to the computer 142 frame grabber CCA 114.

Note that during the above far field operation, the near field steering mirror 418 is moved out of the light path by pivoting on swivel 410 and is laying against the mirror stop 412.

For near field operation, the light image travels through the near field lens 404, is reflected by the fold mirror 408, and reflected off the steering mirror 418 which is swivelled against stop 414, thus in the light path. Once reflected off steering mirror 418, the image is received by the frame transfer CCD 416, processed and transferred to the computer as in the above case.

FIGS. 5A through 5E are the flow charts of the operation of the passive velocity measuring device from initial power up and initialization (FIG. 5A) through different modes of operation for the detection of the target velocity. Mode 1 (FIG. 5B) shows the initial acquisition of the target vehicle and the logic for go/nogo test if target vehicle is speeding. Mode 2 (FIG. 5C) or Mode 3 (FIG. 5D) are entered for system setup and velocity calculations of the target vehicle dependent on if the distance parameter of the field of view and speed calculation distance parameter is known or has to be calculated per optical parameters. The Final Image mode (FIG. 5E) has the optics zoom to near field for final close up image of target vehicle and pertinent vehicle identification. During all modes of operation, software will control prompts and automated system activity. Custom software will interface with frame grabber circuit card 114 special function programs.

FIG. 6 It will be apparent that the passive velocity measuring system is constructed to compute the speed as described in the previous paragraphs dependent upon Mode of operation.

Due to being a passive system, the target speed may be calculated at any angle in the x, y, or z plane of offset dependent upon site calibration.

It is shown that typical to emission type velocity sensors, view path and travel path of the target need to be close. This system using mode 1 or 3 operation with magnification factors needs the same operating parameters. The angle 602 needs to be small (<10 degrees) between the direction of the view 604 and the travel path 608 to have the least error which is in favor of the target.

When using mode 2 or 3 operation, the terrain slope, curve, and look angle may be calculated into the system as a calibration factor thus compensating for these errors. Then the grid overlay 612 may be used for velocity measurement.

What is claimed is:

1. An apparatus for passively measuring the velocity of a moving vehicle comprising:

a camera for acquiring images;

a computer for processing data;

said camera utilizing a frame transfer CCD for acquiring images, wherein said images include said moving vehicle approaching said apparatus and wherein light from said moving vehicle is passed through a near field lens, reflected by a fold mirror, reflected off a steering mirror, and finally passed to said frame transfer CCD for near field operation, and wherein light from said moving vehicle is passed through a far field lens and then passed directly to said frame transfer CCD for far field operation, and wherein said frame transfer CCD sends an image of said moving vehicle to said computer to be processed by a frame grabber which produces multiple frames each with an image of said moving vehicle to be sequentially displayed on a monitor;

said camera is initially calibrated for said far field operation in a laboratory environment using known size targets at known distances and mapping CCD pixels thus producing data which is input into a software lookup table for access by said computer and further producing multiple optical calibration factors dependent on zoom characteristics of said camera, said optical calibration factors placed on said camera so as to be accessible for manual input from said computer for field calibration of said apparatus;

said apparatus is initialized and during said initialization data regarding time, date, location, and speed limit for the site of speed measurement is input into said computer, also during said initialization, camera pointing and video contrast and brightness are set up, and wherein said camera pointing involves pointing said camera so that said CCD acquires images of a first stationary object at a known distance from said apparatus, and a second stationary object at a second distance which is closer to said apparatus than said distance of said first stationary object, said first and second stationary objects being positioned along said moving vehicle's path, and wherein said first and second stationary objects are displayed on said monitor and wherein said monitor displays parallel lines perpendicular to vehicle motion, a first parallel line to be associated with said first stationary object and a second parallel line to be associated with said second stationary object, following said initialization, said moving vehicle is tracked using a centroid tracking algorithm associated with said frame grabber, and an initial determination is made that said moving vehicle is speeding when it is determined that said moving vehicle's speed is greater than said speed limit and where in said moving vehicle's speed is determined by examining two frames with a two second time interval between them, calculating the difference in said vehicle's height between said two frames, using said optical calibration factors to calculate a distance traveled by said vehicle towards said apparatus during said two second time interval, and dividing said distance by said two second time interval;

after said initial determination is made that said moving vehicle is speeding a second determination of said moving vehicle's speed is made and compared to said speed limit, wherein said moving vehicle's speed is determined by said computer prompting said operator to use a pointing device to drag said first parallel line so that it is adjacent to said first stationary object and to drag said second parallel line so that it is adjacent to said second stationary object, then said computer adds nine more lines equidistant and parallel between said first and second parallel lines so as to generate a grid with known distances between grid lines to be displayed on said display, wherein said moving vehicle is tracked using a centroid tracking algorithm associated with said frame grabber as it crosses said grid, distance and time measurements are made as said moving vehicle crosses each of said grid lines and calculations of velocity are made for ten samples and an average of said ten samples is calculated;

after said second determination of said moving vehicle's speed is made, said apparatus switches to said near field operation to acquire a close up image of said moving vehicle and pertinent vehicle identification and said apparatus stores data of said moving vehicle when it is determined it has violated said speed limit, said data including time, date, location, calibration, and speeding information all superimposed on video including said close up image of said moving vehicle showing tag number and operator image.

2. A method for passively measuring the velocity of a moving vehicle comprising:

acquiring images using a camera utilizing a frame transfer CCD for acquiring images, wherein said images include said moving vehicle approaching said apparatus and wherein light from said moving vehicle is passed through a near field lens, reflected by a fold mirror, reflected off a steering mirror, and finally passed to said frame transfer CCD for near field operation, and wherein light from said moving vehicle is passed through a far field lens and then passed directly to said frame transfer CCD for far field operation, and wherein said frame transfer CCD sends an image of said moving vehicle to said computer to be processed by a frame grabber which produces multiple frames each with an image of said moving vehicle to be sequentially displayed on a monitor;

initially calibrating said camera for said far field operation in a laboratory environment using known size targets at known distances and mapping CCD pixels thus producing data which is input into a software lookup table for access by said computer and further producing multiple optical calibration factors dependent on zoom characteristics of said camera, said optical calibration factors placed on said camera so as to be accessible for manual input from said computer for field calibration of said apparatus;

initializing said apparatus and during said initialization data regarding time, date, location, and speed limit for the site of speed measurement is input into said computer, also during said initialization, camera pointing and video contrast and brightness are set up, and wherein said camera pointing involves pointing said camera so that said CCD acquires images of a first stationary object at a known distance from said apparatus, and a second stationary object at a second distance which is closer to said apparatus than said distance of said first stationary object, said first and second stationary objects being positioned along said moving vehicle's path, and wherein said first and second stationary objects are displayed on said monitor and wherein said monitor displays parallel lines perpendicular to said moving vehicle's motion, a first parallel line to be associated with said first stationary object and a second parallel line to be associated with said second stationary object;

following said initialization, said moving vehicle is tracked using a centroid tracking algorithm associated with said frame grabber, and an initial determination is made that said moving vehicle is speeding when it is determined that said moving vehicle's speed is greater than said speed limit and wherein said moving vehicle's speed is determined by examining two frames with a two second time interval between them, calculating the difference in said vehicle's height between said two frames, using said optical calibration factors to calculate a distance traveled by said vehicle towards said apparatus during said two second time interval, and dividing said distance by said two second time interval;

after said initial determination is made that said moving vehicle is speeding a second determination of said moving vehicle's speed is made and compared to said speed limit, wherein said moving vehicle's speed is determined by said computer prompting said operator to use a pointing device to drag said first parallel line so that it is adjacent to said first stationary object and to drag said second parallel line so that it is adjacent to said second stationary object, then said computer adds nine more lines equidistant and parallel between said first and second parallel lines so as to generate a grid with known distances between grid lines to be displayed on said display, wherein said moving vehicle is tracked using a centroid tracking algorithm associated with said frame grabber as it crosses said grid, distance and time measurements are made as said moving vehicle crosses each of said grid lines and calculations of velocity are made for ten samples and an average of said ten samples is calculated;

after said second determination of said moving vehicle's speed is made, said apparatus switches to said near field operation to acquire a close up image of said moving vehicle and pertinent vehicle identification and said apparatus stores data of said moving vehicle when it is determined it has violated said speed limit, said data including time, date, location, calibration, and speeding information all superimposed on video including said close up image of said moving vehicle showing tag number and operator image.

\* \* \* \* \*